US005419213A

United States Patent [19]

Karlyn et al.

[11] Patent Number: 5,419,213

[45] Date of Patent: May 30, 1995

[54] APPARATUS AND METHOD FOR THE SILK-SCREEN PRINTING OF MULTIPLE CURVED PERIPHERAL SURFACES OF AN ARTICLE DEFINED BY MULTIPLE CURVED PERIPHERAL SURFACES

[76] Inventors: William M. Karlyn, 602 Chestnut St., Lynnfield, Mass. 01940; David J. Podalsky, 12 Osgood Rd., Kensington, N.H. 03833; Thomas D. Wiseley, 132 Humphrey Ave., Swampscott, Mass. 01907

[21] Appl. No.: 254,530

[22] Filed: Jun. 6, 1994

Related U.S. Application Data

[62] Division of Ser. No. 43,162, Apr. 5, 1993, Pat. No. 5,343,804.

[51] Int. Cl.⁶ ........................ F16H 19/04; B41F 17/18

[52] U.S. Cl. ........................................ 74/437; 74/109; 74/110; 101/38.1; 101/123; 101/129

[58] Field of Search ...................... 74/89.17, 109, 437, 74/422, 110; 101/38.1, 39, 40, 40.1, 41, 44, 114, 123, 129

[56] References Cited

U.S. PATENT DOCUMENTS

| | | | |
|---|---|---|---|
| 2,419,951 | 5/1947 | Kastel | 74/437 X |
| 3,109,365 | 11/1963 | Karlyn | 101/124 |
| 3,247,786 | 4/1966 | Heyne et al. | 101/123 |
| 3,249,043 | 5/1966 | Karlyn et al. | 101/124 |
| 3,260,194 | 7/1966 | Karlyn | 101/38.1 |
| 3,810,422 | 5/1974 | Kammahn | 101/124 |
| 4,122,768 | 10/1978 | Dubuit et al. | 101/126 |
| 4,498,386 | 2/1985 | Rouly et al. | 101/123 |
| 4,848,227 | 7/1989 | Campioli | 101/123 |

FOREIGN PATENT DOCUMENTS

| | | | |
|---|---|---|---|
| 2060731 | 6/1972 | Germany | 101/123 |
| 3220792 | 12/1983 | Germany | 101/38.1 |
| 55-39309 | 3/1980 | Japan | 101/39 |
| 55-39310 | 3/1980 | Japan | 101/39 |
| 56-89947 | 7/1981 | Japan | 101/38.1 |
| 61-19364 | 1/1986 | Japan | 101/38.1 |
| 61-179744 | 8/1986 | Japan | 101/124 |

*Primary Examiner*—Allan D. Herrmann

*Attorney, Agent, or Firm*—Herbert L. Gatewood

[57] ABSTRACT

Silk-screen printing apparatus is provided for the silk-screen printing of articles such as oval-shaped bottles and containers on the two major curved peripheral surfaces thereof, sequentially, with one printing pass. The apparatus utilizes, in this case, two squeegees positioned one behind the other and synchronized in such a manner as to force ink through a screen provided with two image patterns as each of the two image patterns on the screen moves sequentially over the two curved surfaces to be printed.

4 Claims, 8 Drawing Sheets

APPARATUS AND METHOD FOR THE SILK-SCREEN PRINTING OF MULTIPLE CURVED PERIPHERAL SURFACES OF AN ARTICLE DEFINED BY MULTIPLE CURVED PERIPHERAL SURFACES

This application is a division of application Ser. No. 08/043,162, filed Apr. 5, 1993, now U.S. Pat. No. 5,343,804.

BACKGROUND OF THE INVENTION

1. Field of the Invention

This invention relates, in general, to an apparatus and method for the silk-screen printing of each of the multiple curved surfaces of an article defined by multiple curved peripheral surfaces. In particular, the invention relates to apparatus and a method for the silk-screen printing of the peripheral, curved surfaces or panels on objects approximating triangular and rectangular cross-sections. More particularly, it relates to apparatus and a method for the silk-screen printing of the two sides of an article, e.g. a plastic bottle, having an oval-shaped cross-section, in a single pass.

2. Description of the Prior Art

The term "oval-shaped cross-section" as used herein is intended to cover articles, e.g., bottles, which have, in general, the cross-sectional shape of an oval. But, in a broader sense, the term "oval-shaped cross-section (oval-shaped)" is used to include all articles or objects having two opposed surfaces with a varying radius of curvature which is outwardly convex. The convex surface may be interrupted by flats or concave areas. Nevertheless, as will be appreciated hereinafter the invention is not limited to such oval-shaped articles; it includes articles having multiple curved surfaces defining its periphery, e.g., three, four, or even more curved surfaces of varying radius of curvature.

Cylindrical-shaped articles or objects, e.g. bottles, whether glass or plastic, having a circular or round cross-section can, in some cases, be silk-screen printed by merely rolling engagement of the bottle with the silk-screen surface. Thus, the frictional engagement of the article by the silk-screen is sufficient to cause rotation of the article in reasonably good registration with the screen, and without slippage. No positive registration means for rotationally driving the object to be printed in synchronism with the relative translatory movement of the silk-screen is required or provided in such cases. Nevertheless, in instances where close registration is required or where slippage between the bottle and screen might occur, a gear and rack, or simple round pully and cable, is conventionally used to provide the desired registration between the two.

In the silk-screen printing of the surface of an article having a varying radius of curvature such as a cylindrical-shaped bottle having an oval-shaped cross-section, this is not the case. The proper and positive registration between the surface of the article to be printed and the silk-screen is of critical concern, to prevent smudging of the printing ink on the surface being printed, i.e., the ink receiving surface. Thus, the curved surface of the bottle being printed must be maintained at a uniform linear velocity equal to the relative linear velocity of translation of the screen.

Any radius of curvature, as will be appreciated, defined by a relatively flattened bottle surface, e.g., that of an oval-shaped bottle compared to one having a circular-shaped cross-section, is much greater than a radius of rotation of the bottle about its own central axis. The curved surface of an oval-shaped bottle, moreover, only approximates that of a circle. Only a portion of any oval's curved surface is really the arc of a circle. Therefore, it is necessary to provide some positive drive means for moving the bottle's curved surface in synchronism with the linear translation of the screen, to prevent slippage with attendant blurring of the ink applied to the receiving surface.

Moreover, it is known to be absolutely necessary for satisfactory printing, i.e., sharp images, to provide that the squeegee or ink-knife in such a silk-screen printing process always be over the center of the circle circumscribed by the local radius of curvature of the ink receiving surface as the printing of the curved surface progresses. Thus, whether the squeegee is moved during the printing of the image or remains stationary while the silk-screen moves, or both the silk-screen and squeegee move, the squeegee must always be over the center of the circle circumscribed by the radius of curvature.

Thus, in the silk-screen printing of a bottle having an oval-shaped cross-section, to obtain a printed image that is relatively sharp, it is necessary to literally roll the surface to be printed over the working surface, i.e., the bottom surface, of the silk-screen. In other words, the local surface on the article being printed, i.e., that particular location on the surface receiving the printed image, must be rotated about its own center of curvature, at the same time that the bottle is being rotated about its longitudinal axis. As is well known, these centers are not concentric.

The printing of the curved or peripheral surfaces of an article having an oval-shaped cross-section has long been known. It is accomplished with the use or variation of one of three well known principles, e.g., (1) the screen moves horizontally, the squeegee being fixed and located above the center of the circle described by the oval section, i.e., ink receiving surface to be printed, the oval section being printed as it is rotated in synchronization with the screen translation, and in the same direction; (2) the screen is stationary, the squeegee being moved, the oval section being printed as it is rotated on the center of the circle described by the oval section, the squeegee and that center of curvature moving in the same direction; and (3) the oval-shaped article being printed, e.g., a plastic bottle, is rotated about its center on a vertically and horizontally oscillating fixture bar, the squeegee traveling in linear direction in synchronization with the center of the circle described by the oval section being printed, the screen being stationary. In a variation of the third method disclosed, the oval-shaped article is rotated about its center on a fixture bar that oscillates vertically as the squeegee travels in one direction in synchronization with the movement of the center of the circle described by the oval section being printed and in the same direction as the squeegee, the screen being moved in the opposite direction. Exemplary of prior art patents directed to the silk-screen printing of cylindrical-shaped articles having an oval-shaped cross-section are U.S. Pat. Nos. 3,109,365; 3,249,043; 3,260,194; 4,848,227; and French Patent Nos. 2,250,637; and 2,346,152.

U.S. Pat. No. 3,109,365 entitled "Stenciling Apparatus," which issued to William M. Karlyn on Nov. 5, 1963, and which was assigned to the Autoroll Machine Corporation, the assignee of the instant invention, discloses and claims a fixture bar which rotates the article to be printed, in approximate synchronism with the linear translation of the silk-screen. This is accomplished by means of a lost-motion connection between a crank arm affixed to the screen frame and a rod carrying the article. The variation in angular velocity of the article brought about by this device tends to offset the variation in the radius of curvature of the surface of the article being printed, at least to a limited extent, provided that the parts of the apparatus causing the lost-motion connection are properly proportioned. Nevertheless, such a silk-screen printing apparatus suffers from the fact that only a small variation in the radius of curvature of the surface to be printed is permissible. In practice, a silk-screen printing device of this construction can successfully label the portions of the oval which have a large and nearly uniform radius of curvature, but cannot pass the silk-screen around the more sharply curved parts. Although the apparatus of this patent is disclosed to be able to silk-screen print two successive articles upon each complete reciprocation of the silk-screen, the apparatus is, nevertheless, limited to the silk-screen printing of only one of the surfaces of each of the oval-shaped bottles, in one pass. In the event both surfaces are to be printed, the first is printed at one printing station, the ink dried, the bottle flipped over and then passed to a second printing station downstream for printing the other surface.

U.S. Pat. No. 3,249,043, entitled "Apparatus For Stenciling Oval Articles," and which issued to W. M. Karlyn et al, on May 3, 1966 is directed to apparatus which compensates for the variation in radius of curvature of an oval-shaped article. This is accomplished by maintaining an accurate inverse relationship of the angular velocity of the article being printed. Thus, an upwardly movable carrier, i.e. a fixture bar, is provided bearing a drive shaft, on which is mounted at one end a chuck for rotatably supporting the oval-shaped article to be printed and at the other end an oval-shaped gear for rotationally driving the article in synchronism with the linear velocity of a reciprocatory silk-screen. The oval-shaped gear has the same dimension and outline as that of the oval-shaped article to be printed. Thus, as the article is rotated in pressure engagement with the screen, the movable carrier which is pivoted at the end opposite from the drive shaft, accommodates a transverse movement of the chuck upwardly corresponding to the varying radius of the article, so as to keep its surface always in contact with the screen. Although the invention, as disclosed in this patent, is inoperable, it was later learned that one-sided printing of the oval-shaped object was possible. This is accomplished by keeping the single squeegee synchronized in a reciprocating relationship with the screen motion, using either well known mechanical or pneumatic means. Thus, following the principle well known to those in the silk-screen printing art, to keep the squeegee over the center of the circle described by the oval, this necessitated also moving the squeegee, and in a direction opposite to that of the screen. Nevertheless, it has not been found possible until now to print, in one pass, both sides of an oval-shaped object with the apparatus of that invention.

In U.S. Pat. No. 3,260,194 which issued to William M. Karlyn on Jul. 12, 1966, there is disclosed a registering drive mechanism which forms a positive driving connection between the screen frame and a bottle being printed. The mechanism includes in one case a clamp with adjustable jaws for gripping the base of the bottle being printed. In a modification of the mechanism for printing the surface of an oval-shaped bottle, the clamp includes a protrusion which is received in a mating recess in the base of the bottle. The bottle is supported in a cradle which is shaped to hold the bottle in registered relationship to the screen. The cradle is mounted on a rod, i.e. a spindle or drive shaft, disposed transversely to the direction of travel of the screen for oscillation about the rod axis as the screen passes over the bottle surface, the rod itself being rotatably mounted. For rotatably driving the clamp and bottle in synchronism with the silk-screen as the latter translates, a drive pinion is pinned to the spindle for the driving of the clamp, and meshed with a horizontally disposed rack. The rack forms one end of a four-bar parallelogram linkage including a pair of links and a drive bar. The drive bar of this parallelogram linkage is connected to a bar which is connected to the frame of the silk-screen. Thus, translation of the screen produces a corresponding translation of the rack and synchronized rotation of the pinion and bottle. This invention, although quite satisfactory for some purposes, is limited to the printing of only one curved surface of an oval-shaped bottle. Moreover, as is well known to those in the silk-screen printing art, in the printing of an oval-shaped surface, only that portion of the surface which describes a segment of a circle can be printed.

In French Patent No. 2,250,637 there is disclosed apparatus for the silk-screen printing of oval-shaped objects. The apparatus disclosed in this patent is believed to have a fixture bar that not only oscillates vertically but also horizontally. French Pat. No. 2,346,152 is believed to show an improved means over that disclosed in French Pat. No. 2,250,637, namely, a chain or cable and double grooved wheel, for causing rotation of the object on its center during the printing process.

It is known to provide a multiplicity of squeegees at one printing station. For example, in U.S. Pat. No. 3,251,298, there is disclosed the silk-screen printing of the body portion and neck portion of a cylindrical-shaped bottle, at one station. Thus, there are provided two squeegees and two screens in side-by-side relationship. Where two or more different imprints or colors are to be printed on the bottle, separate stations or locations are provided lengthwise of the silk-screen printing machine. As disclosed in U.S. Pat. No. 3,251,298, during printing, the two squeegees are moved in unison with the bottle being decorated, i.e. at the same constant linear velocity and in the same direction. The bottle is simultaneously rotated about its longitudinal axis in a direction opposite to its direction of travel. The body and neck screens are moved independently of one another, the body screen moving in the direction opposite to the direction of travel of the bottle during a printing operation, i.e., opposite to that of the squeegees.

Others patents of which I am aware, in addition to U.S. Pat. No. 3,251,298 have, heretofore, disclosed silk-screen printing apparatus wherein the silk-screen and squeegee or ink-knife are moved in opposite directions. Exemplary of such prior art are U.S. Pat. Nos. 4,005,649 and 4,245,554, in addition to the earlier disclosed U.S. Pat. No. 4,848,227.

U.S. Pat. No. 4,005,649 discloses a silk-screen printing machine wherein an object to be printed travels in a path, while being rotated about its axis, and which includes a movable printing screen and cooperating movable squeegee. The object to be printed, according to the patentee, will have only a single diameter, in general; however, objects wherein only a portion has a single diameter can also be printed. The bottle is caused to be rotated about its axis by a gear which is attached at the end of the shaft connected to the centering element of the bottle to be printed meshing with a horizontally disposed rack. According to the patentee, in the case where the object to be printed or the portion thereof to be printed has a diameter corresponding to double the diameter of the gear, the squeegee carriage and silk-screen carriages will be moved in opposite directions to one another.

U.S. Pat. No. 4,245,554 disclose a silk-screen printing machine wherein a web of material is printed with a succession of images. During the printing operation, the web is rolled against the silk-screen by a backing roller, which together with the ink-knife, i.e., squeegee, is moved in the opposite direction to the silk-screen.

In U.S. Pat. No. 4,848,227, which issued on Jul. 18, 1989, and entitled "DEVICE FOR THE SILK-SCREEN PRINTING OF CYLINDRICAL OBJECTS HAVING AN ELLIPTICAL CROSS-SECTION," there is disclosed a silk-screen printing apparatus wherein the silk-screen carriage and ink-knife or squeegee carriage both reciprocate back and forth in opposite directions. A horizontally disposed flat frame, like the fixture bar disclosed in the earlier above-mentioned U.S. Pat. No. 3,249,043, is mounted to pivot vertically upwardly at one end of the frame. At the other end is rotatably mounted, in transverse disposition, a spindle having at one end a chuck for holding the bottle to be printed. The other end of the spindle is fixedly connected to a toothed sector, which is mounted at its center to the bottom end of an elongated plate which extends vertically downwardly from the ink-knife carriage. The toothed sector which has a pitch circle diameter, according to the patentee, corresponding to the curvature of the cylindrical-shaped object to be printed, meshes with a horizontally disposed rack located on the bottom of the screen frame. The ink-knife carriage is connected to one end of a connecting rod, the other end of which is connected to a rocker arm which, in turn, is connected to the main drive. Thus, as the rocker arm rocks back and forth, the ink-knife carriage translates. This translatory motion causes the toothed sector to rotate back and forth which, in turn, causes the bottle to be printed to be rotated in likewise manner while at the same time being rotated on its own axis. As the toothed sector meshes with the rack provided on the silk-screen carriage, the silk-screen carriage is caused to move linearly back and forth in opposite direction to the translation of the ink-knife carriage. This opposite direction movement results from the fact that the spindle located on the flat frame is fixed horizontally, i.e., it cannot move in the horizontal direction of travel of the bottle being printed. The spindle can only move vertically upwardly and downwardly in an arcuate manner as the flat frame is pivoted vertically up and down.

Although the invention disclosed in U.S. Pat. No. 4,848,227 may be found quite satisfactory for certain silk-screen printing operations, its use is attendant with certain disadvantages. For example, the apparatus disclosed is not only limited to the silk-screen printing of only one surface of a bottle, it also is believed somewhat limited as to the curvature of the surface being printed, to obtain an image without some smudging. This is due to the fact that the toothed sector comprises a round cross-section while the bottle being printed is not of such a cross-section. Moreover, standard or available gears may not have the same radius as the segment of the circle described by the curved surface to be printed. As a result, those portions of the curved surface which vary from the radius of the standard or available gear are not printable. Further, only that portion or segment of the curved surface of an oval-shaped object that describes a circle can be printed. Accordingly, if the curvature of the surface of a bottle to be silk-screen printed is not the same as that of a gear or toothed sector used, any letters printed will be distorted. For example, if the bottle radius is less than that of the toothed sector, the letters will be somewhat shortened. On the other hand, if the radius of the print receiving surface is greater than that of the toothed sector, the letters will be somewhat elongated.

In addition to the silk-screen printing apparatus disclosed in the above patents, which are believed limited to the printing of only one curved surface of an oval-shaped object, or which show the silk-screen printing of two surfaces in side-by-side relationship, we are aware of apparatus developed for the printing of the two sides of an oval-shaped article. The printhead of this apparatus, however, comprises a single squeegee using a very long printing stroke, made possible by a rather large planetary gear system. It is costly to tool, cannot be used on a universal machine, and is not readily convertible from the printing of oval-shaped cylindrical objects to round cylinders or flat printing.

Accordingly, none of the prior art of which the present inventors are aware disclose silk-screen printing apparatus wherein a multiple number of curved surfaces of an article whose periphery is defined by a multiple number of curved surfaces can be printed in sequential manner, at one printing station. Thus, there still remains the need for such a silk-screen printing apparatus and, in particular, silk-screen printing apparatus that is capable of printing both curved, peripheral sides of an oval-shaped article such as the commonly used plastic and glass bottles.

SUMMARY OF THE INVENTION

Accordingly, it is a general object of this invention to overcome the disadvantages of prior art silk-screen printing apparatus, particularly in the printing of multiple curved peripheral surfaces of an article.

More particularly, the present invention has as a primary object the providing of an apparatus for the silk-screen printing of both of the curved, peripheral surfaces of an article or object having an oval-shaped cross-section, and in a single pass.

A further major object of the invention is to provide a novel method of silk-screen printing wherein both curved, peripheral surfaces of an oval-shaped article are printed sequentially at the same printing station, and in a single pass.

A further object of the invention is to provide silk-screen printing apparatus that is universal in design and capable of printing one or both sides of an oval-shaped article in one motion such as the commonly used oval-shaped plastic and glass bottles.

A still further object of the invention is to provide silk-screen printing apparatus for the printing of one or more curved, peripheral surfaces of an article defined by one or more such a surface that is considerably simplified in its structure and operation as compared to prior art silk-screen printing apparatus capable of printing only one curved surface of an article at a single printing station, or multiple curved peripheral surfaces of an article but only at multiple printing stations spaced-apart from one another along the lengthwise direction of the printing apparatus.

Still a further object of the invention is to provide silk-screen printing apparatus requiring considerably less equipment and tooling for the printing of multiple curved peripheral surfaces of an article defined by a multiple of curved, peripheral surfaces compared to silk-screen printing apparatus now used in the printing of such surfaces of an article, at a multiple number of printing stations.

Another object of the invention is to provide means for the silk-screen printing of an oval-shaped article wherein such printing means occupies less space than heretofore required for a silk-screen printing machine capable of printing both sides of an oval-shaped article.

Still another object of the invention is to provide universal silk-screen printing apparatus which can be readily and quickly converted with simple changeover parts to be able to print either cylindrical-shaped, e.g. oval-shaped or round bottles, or flat objects in conjunction with automated feeding.

Quite advantageously, the silk-screen printing apparatus of the invention ensures accurate registration and clear printing on the entire oval surface of an oval-shaped article including those curved surfaces which may vary in radius from the radius of the largest local surface of an oval-shaped gear.

BRIEF DESCRIPTION OF THE DRAWINGS

For a better understanding of the present invention, reference should be had to the following detailed description of the preferred embodiments of the invention which is to be read in conjunction with the accompanying drawings, in which.

DETAILED DESCRIPTION OF THE INVENTION AND THE PREFERRED EMBODIMENTS THEREOF

While the present invention will be described hereinafter with particular reference to the accompanying drawings, it is to be understood at the outset that it is contemplated that the present invention may be varied in specific detail from that illustrated and described herein while still achieving the desirable characteristics and features of the present invention. Accordingly, the description which follows is intended to be understood as a broad enabling disclosure directed to persons skilled in the applicable arts, and is not to be understood as being restrictive.

Figure 1:
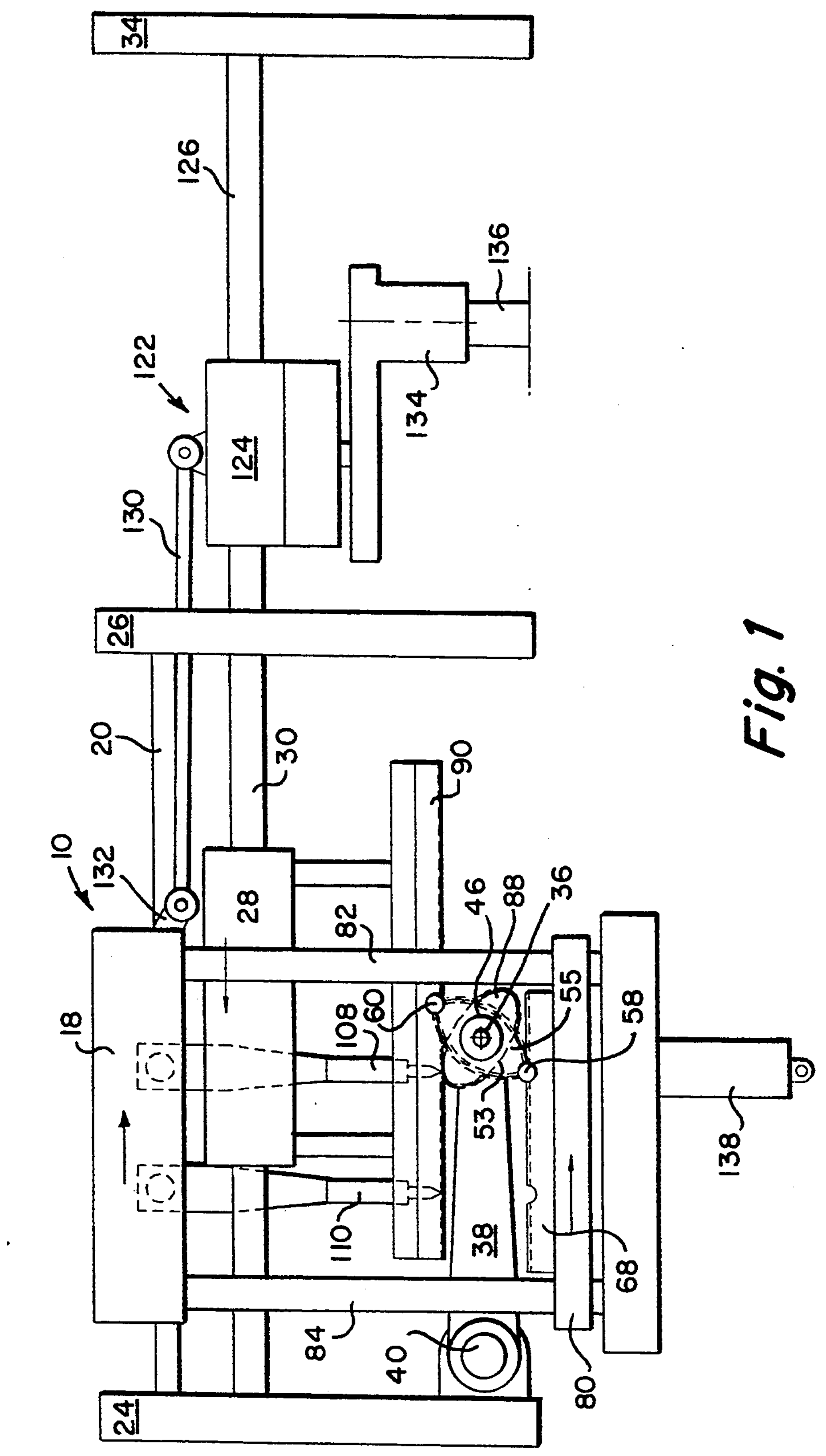
FIG. 1 is a diagrammatic view showing the rear of a silk-screen printing device according to the invention wherein the bottle to be printed is transported from right to left in the drawing to the printing station.
Figure 2:
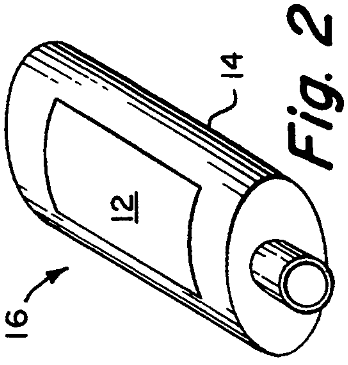
FIG. 2 shows a view in perspective of an oval-shaped bottle, the two curved surfaces of which are printed in one printing pass or stroke by apparatus or method according to the invention.

Referring now to FIG. 1 of the drawing there is disclosed therein a silk-screen printing apparatus or device 10 for the silk-screen printing of the curved, peripheral surfaces 12, 14 of a conventional plastic bottle 16 having an oval-shaped cross-section as best seen in FIG. 2.

The silk-screen printing apparatus 10 comprises a horizontally disposed ink-knife or squeegee support carriage 18 slidably mounted for reciprocal translation on a pair of elongated, horizontally disposed cylindrical shaped rods 20, 22. The ends of rods 20, 22 are fixedly mounted in the vertically upright, spaced-apart, opposed parallel members 24, 26 which are a part of the supporting structure for the silk-screen printing device 10. The squeegee carriage 18 is located in conventional manner above a horizontally disposed silk-screen carriage 28 and is mounted for translation in reciprocal manner on a pair of parallel, horizontally disposed, elongated rods 30, 32 of circular-shaped cross-section like rods 20, 22. The ends of the rods 30, 32 are fixedly mounted by conventional means in vertically disposed support members 24, 26. The rods 20, 22 and 30, 32 lie in horizontally disposed planes, parallel to that defined by the floor or other planar, horizontally disposed surface (not shown) supporting the structure (not fully shown) such as represented by support members 24, 26, and 34 supporting the silk-screen printing apparatus 10.

The rods 20, 22 and 30, 32 can, if desired, be long enough to have their respective ends in vertical support members 24, 34. In that case, the support member 26 will serve as a bearing or horizontal support member for the rods 20, 22.

The bottle 16 is detachably fixed to, and rotatably supported during printing at, the first or one end of a spindle 36, the spindle being rotatably supported according to usual techniques by a fixture bar or carrier 38 at the upstream end thereof, as shown in FIG. 1. Fixture bar 38 is pivotally mounted to support member 24 at its downstream end 40 in a horizontally defined plane for reciprocal movement up and down vertically in arcuate manner. As will be readily appreciated, the spindle 36 is fixed horizontally by the fixture bar 38 so that, when located in its horizontal plane at rest, i.e., its location prior to being pivoted and the location to which it returns, it cannot move horizontally. Thus, the center of curvature of the circle described by the curved surface of the oval-shaped bottle 16 must move during the silk-screen printing process, along with the linear movement of the squeegee carriage and in the same direction, as will hereinafter be made more clear.

The one end of the spindle 36 is provided with and supports conventional means for fixedly supporting the bottle 16 during the printing process comprising a chuck 42 conforming to the base of the bottle. The chuck is pinned in usual fashion to the end of spindle or shaft 36. A conical inflation nozzle represented by reference numeral 44 intrudes into the mouth of the bottle 16 to bring it into proper axial alignment with the spindle 36. The inflation nozzle is rotatably supported and is reciprocal along the rotational axis of the spindle by means well known to those in the silk-screen printing art. Such a nozzle is disclosed in U.S. Pat. No. 3,249,043, above-disclosed, the disclosure of which patent is fully incorporated herein by reference. Nevertheless, it will be readily appreciated that other bottle support means now known to those in the art or even later invented may be provided instead, if desired. This will depend somewhat upon the particular shape and size of a bottle, or other article or object being printed and forms no particular part of the invention disclosed herein.

Figure 3:
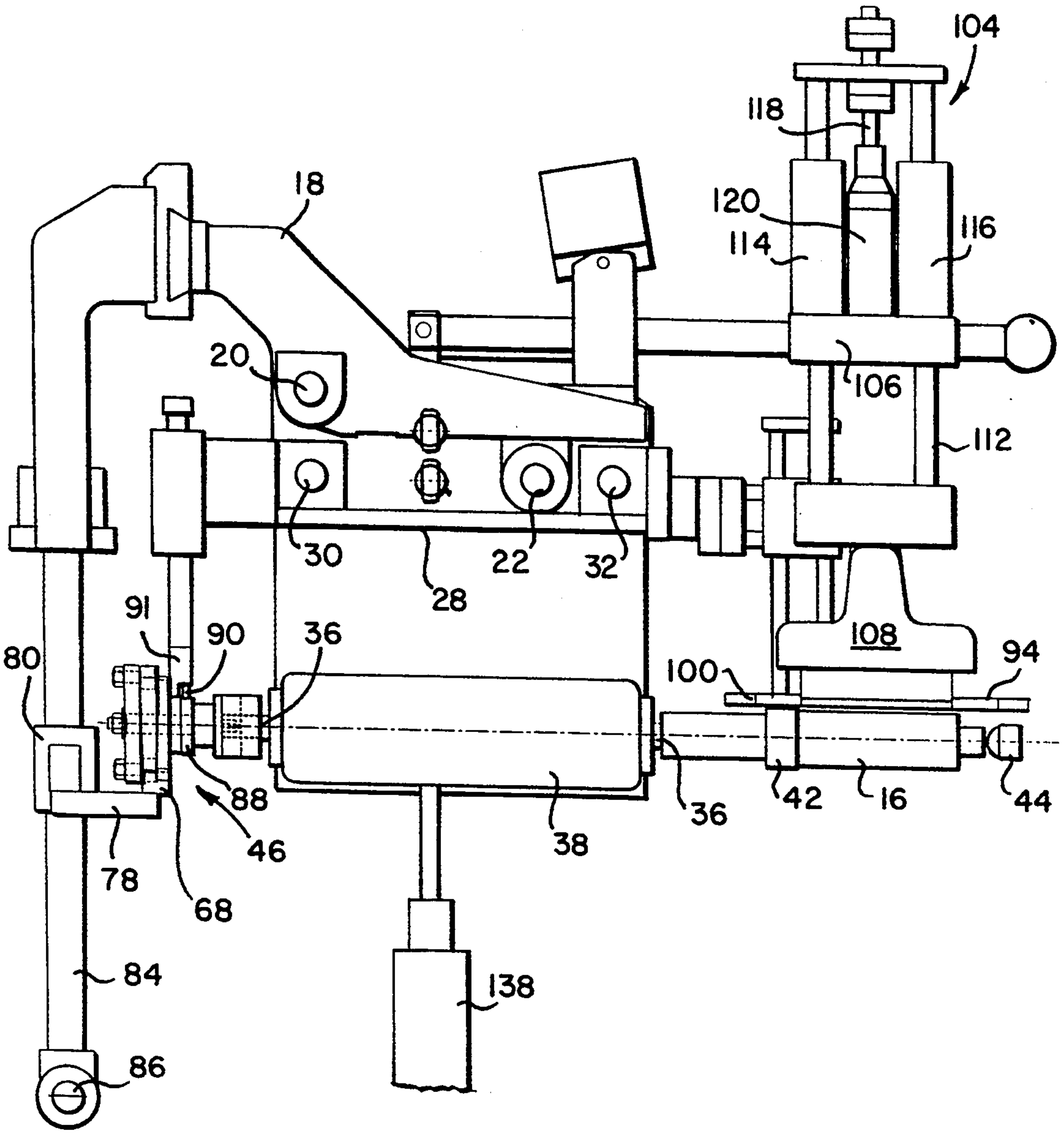
FIG. 3 is a diagrammatic cross-sectional view showing that portion of the silk-screen printing device such as shown in FIG. 1 taken at a point just to the left of the middle vertical support member and comprising the squeegee and silk-screen carriage, and fixture bar, looking at such members from the right to the left in FIG. 1.
Figure 6:
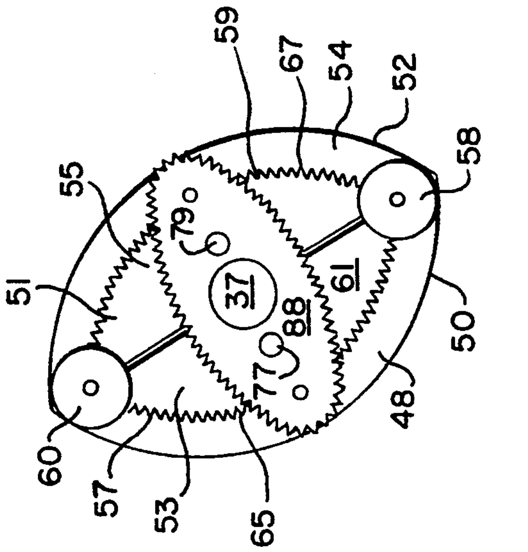
FIG. 6 is an end view showing only the cam roller mount, the cam rollers, oval-shaped cam segmented gear and cam gear of the cam means or gear train according to the invention, taken looking from the rear outwardly in FIG. 5 but not showing the two horizontally disposed elongated members.

The spindle 36 is rotationally driven by cam means 46 provided at the second or other end of the spindle, i.e., the end opposite from that supporting chuck 42. The cam means or gear train 46 comprises a cam roller mount 48 which is defined, as shown in FIG. 6, by two opposed, curved, peripheral surfaces 50, 52 and two spaced-apart, parallel, planar inner and outer or end surfaces 54, 56, the cam roller mount or member 48 being mounted to the spindle 36 so that these two latter-named surfaces are disposed perpendicularly to the spindle's longitudinal axis, as shown in FIG. 3.

To cam roller mount 48 is mounted two elongated, circular-shaped cam rollers or members 58, 60, each being mounted for rotation about its longitudinal axis. The cam rollers are located in opposed disposition at the ends of the cam roller mount, as believed best shown in FIGS. 4, 6 of the drawings. The particular location of the cam rollers 58, 60, as will be better appreciated hereinafter, is of critical importance. The longitudinal axis of each cam roller must be parallel to the longitudinal axis of the spindle 36. Nevertheless, the particular outline or shape of the cam roller mount 48 is of no particular concern to the practice of the invention. The peripheral surfaces 50,52 need not be curved; they can be straight, if desired. The main consideration for the cam roller mount 48 is that it provides proper support and location for the cam rollers, as later more fully disclosed. Also, the cam roller mount need be wide enough so as to allow gear support member 49 and the cam segmented gear 51 to be fixedly, but removably, connected thereto, if desired.

Figure 5:
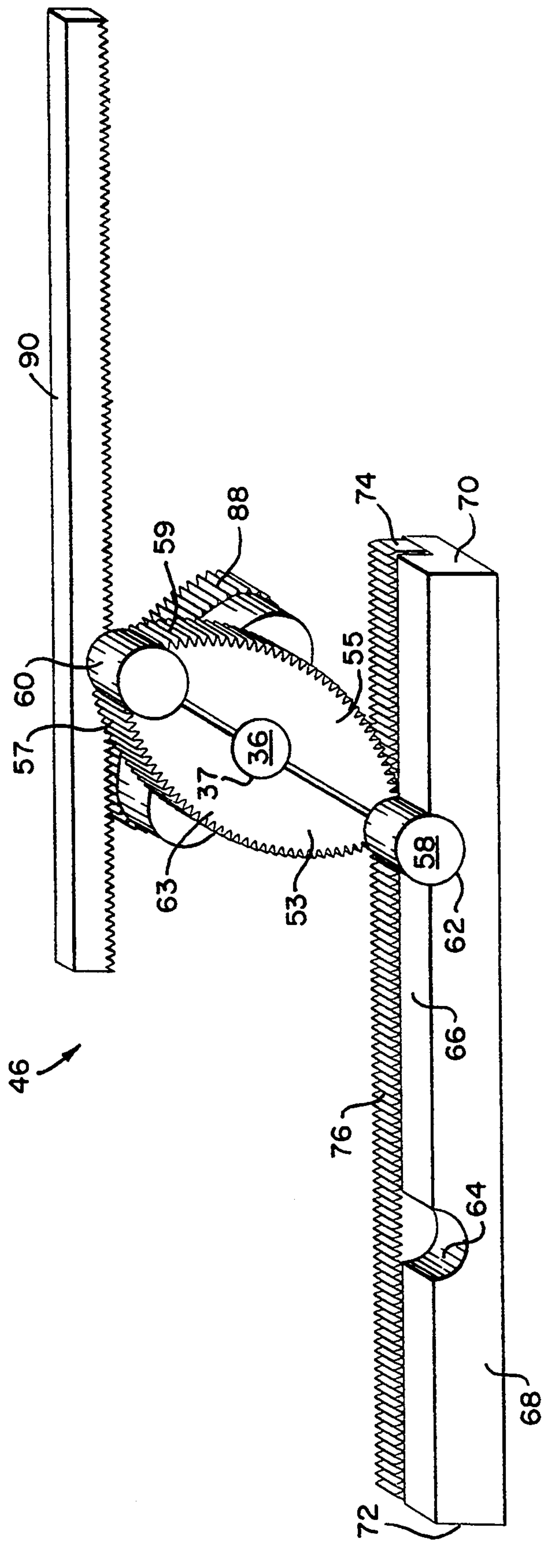
FIG. 5 is an enlarged view in perspective showing the apparatus mechanism of the invention shown in FIG. 4 whereby the translatory motion of the squeegee carriage can be used to rotationally drive the spindle in counterclockwise direction, and at the same time drive the silk-screen carriage in opposite linear direction to the squeegee carriage, while also rotating the article being printed in counterclockwise direction, the cam roller mount not being shown for sake of clarity.

The cam rollers 58, 60 are operatively associated during the printing cycle with respective arcuate-shaped, elongated notches 62, 64, as later more fully disclosed. These notches are provided in the top planar surface 66 of elongated member 68 defined by an upstream or feed end 70 and a downstream end 72. The notches 62, 64 extend in lengthwise direction, in a direction transverse to the length of member 68 and parallel to the rotational axis of spindle 36. As best shown in FIG. 5 of the drawings, the arcuate-shaped notches extend inwardly from the top surface 66 of the elongated member 68. These notches are each most preferably of a half-moon shape, as shown in the drawings, and define a half-circle having a radius only slightly larger than the radius of the circular-shaped cam rollers 58, 60. Thus, cam rolls 58, 60 nest closely in the respective notches 62, 64 when coupled therewith without any slack or relative motion between the cam rollers and notches so coupled together.

Thus, it will readily be appreciated from the above that the distance between the next adjacent notches on the elongated member 68 is determined by the distance between and location of cam rollers 58, 60. The cam rollers, later more fully disclosed, are caused to rotate in a circle by the translation of the elongated member 68 in the horizontal plane. Accordingly, the axial centers of the cam rollers 58, 60 will each lie on the circle described by these centers in rotation of the cam rollers. That being the case, and since the cam rollers are to be coupled with the next adjacent arcuate-shaped notches, the distance between the centerlines defined by these two notches will be determined by the length of the arc or portion of circle connecting the centers of cam rollers 58, 60. The centerline of an arcuate-shaped notch will, of course, be determined by the circle described by it. Accordingly, in the most preferred aspect of the invention the diameter of an arcuate-shaped notch will be essentially the same as the diameter of a cam roller. And, a diameter of both will lie in the same horizontal plane, i.e., the horizontal plane defined by the top surface 66 of the elongated member 68. As will be better appreciated later on the linear distance apart that two next adjacent notches must be is determined by the radius of curvature of the print receiving surface.

In association with elongated member 68 and the notches 62, 64 there is provided an elongated horizontally disposed first rack 74 which extends in lengthwise direction of elongated member 68. The rack 74 is provided with a plurality of spaced-apart teeth denoted generally by reference numeral 76, the top surfaces of which are located in a horizontally disposed plane parallel to the plane defined by top surface 66. The top planar surface 66 defines the intermediate pitch line of the teeth.

As shown in the drawings (FIG. 3) the elongated member 68 is connected at its bottom to horizontally disposed arm 78 at one end, the other end of arm 78 being connected to a slide member 80. This slide member is mounted for movement up and down on vertically disposed elongated support members 82, 84, the top ends of which are connected to the squeegee carriage 18. The bottom ends of support members 82, 84 are mounted to a horizontally disposed member 86 for sliding movement lengthwise of the silk-screen printing machine. The slide member 80 is provided with means (not shown) for fixedly locating the slide member at a desired position vertically on the support members 82, 84. Thus, the elongated member 68 is supported in such a manner as to be movable up and down vertically so as to accommodate different size articles, e.g., plastic or glass bottles, to be printed. This can readily be accomplished by those skilled in the art.

Thus, it will be appreciated that as squeegee carriage 18 is translated back and forth in a horizontal plane, the elongated member 68 is reciprocated back and forth in like manner in a plane parallel to the plane defined by the squeegee carriage and fixed vertically in relation thereto a predetermined distance.

Figure 4:
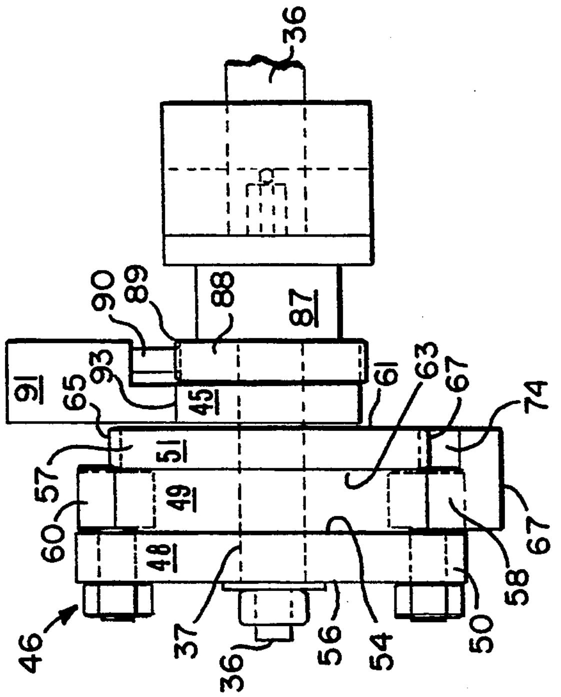
FIG. 4 is an enlarged schematic front view taken from FIG. 3 to better show the apparatus mechanism or cam means for causing rotation of the spindle, hence object to be printed, and translation of the silk-screen in the direction opposite from the plurality of squeegees.

The elongated member 68, as best seen from FIGS. 4, 5 of the drawings, is provided in its top surface with both the notches and the rack 74; however, this need not necessarily be the case. The rack 74 can be provided on the top surface of a separate elongated body member, if desired, and then such a member fixedly attached to the elongated body member provided with notches by suitable fastening means according to usual technique.

Although the cam rollers 58, 60 are most preferably of circular-shaped cross-section, the same as are notches 62, 64, as shown in the drawings, the cam rollers and notches need not necessarily be of this shape. These members, though less desired, can be of any shape provided they perform the function desired, e.g. of triangular or irregular shape. Nevertheless, the circular shape is most desired for the cam rollers and notches as cam rollers and notches of such a shape easily nest together, as desired, and such shapes can be provided of close tolerance. Whatever the shape of the cam rollers and notches, however, these two members should be of the same complementary shape and dimensioned relative to one another as to provide a close nesting or seating of the cam rollers in the respective notches. Also, the axial centers of both must lie in the same horizontal plane when coupled together, as earlier disclosed.

The cam rollers 58, 60, as disclosed earlier, are most preferably mounted to the cam roller mount 48 so as to be rotatable. This can readily be accomplished according to conventional techniques, the elongated cam rollers or members 58, 60 being so mounted that they extend outwardly from the inner planar surface 54, the rotational axis being perpendicular thereto (FIG. 4). Nevertheless, in certain cases, the elongated cam members 58, 60 may be fixedly mounted to the cam roller mounting member 48. This is much less preferred, however, as elongated member 68 will be somewhat more easily translated by cam members that are rotatably mounted.

The cam rollers 58, 60 are shown in the drawings to be mounted on the inner planar surface 54 of cam roller mount 48; however, if desired, the rollers can be mounted on the outer surface 56. In such a case the elongated member 68 will be extended so as to be located adjacent the outer surface of the cam roller mount.

Located inwardly of the cam roller mount 48 is a segmented gear 51, as will be appreciated by reference to FIG. 4. The segmented gear 51 comprises two segments 53, 55 of arcuate shape defined by curved surfaces 57, 59, respectively, each of which is provided with teeth located transversely and perpendicular to the inner and outer planar surfaces 61, 63. These latter surfaces are provided in perpendicular disposition to the longitudinal axis of spindle 36. The curved surfaces of gear segments 53, 55, as better shown in FIG. 6, are each of the same varying radius of curvature along their length; however, this need not necessarily be the case. This will depend upon the particular article or object, e.g. bottle, being silk-screen printed, and the curved peripheral surfaces defining the article.

The gear segments 53, 55 can be, if desired, segments or portions taken, i.e., cut-out, from commercially available circular-shaped gears or sectors. Thus, in general, the gear segments 53, 55 will be joined together using conventional techniques to provide the segmented gear 51. Nevertheless, if desired, these segments need not themselves be joined together. The segments can, instead, be independently connected to the cam roller mount 48. The important consideration is that the respective ends of the pitch lines of the mating segments define essentially a single line at their intersections, as will be readily appreciated by reference to FIG. 6, these pitch lines being referred to generally by reference numerals 65, 67, the reason for which will be more fully disclosed hereinafter. The intersections of these pitch lines is denoted by the "x", i.e., the centers of rotation of cam rollers 58, 60 (FIG. 6). Nevertheless, it will be appreciated that the curved surfaces of the gear segments need not actually be of such a length as to mate together. It is sufficient that an imaginary extension of the curved pitch lines intersect with one another defining a line ("x") transverse and perpendicular to the inner and outer surfaces 61, 63. The intersections of pitch lines 65, 67 defined by the ends ("x") of the mating gear segments 53, 55 of the segmented gear must be coincident with the axis of rotation of the cam rollers 58, 60, respectively.

The intermediate pitch diameter of the circle described by an arcuate-shaped gear segment should be more preferably the same as that described by the teeth in rack 74. Thus, the teeth of the gear segment and rack will mesh together without undue wear on either.

The pitch diameter of an arcuate-shaped gear segment, as earlier disclosed and best seen in FIG. 6, passes through the centers of the cam rollers 58, 60. Thus, as will be later more fully appreciated, continued translation of the elongated member 68 results in an arcuate-shaped gear segment meshing with the rack 74 and continued rotation of the spindle 36 and article, e.g., bottle, 16 about its axis of rotation.

Most preferably, the rack 74 is of a continuous length; however, this need not necessarily be the case. The rack can be provided of spaced-apart linear segments each of suitable length. This length will be determined by the length of the arc of an arcuate-shaped gear segment.

Although in the practice of the invention, the segmented gear 51 has been provided by fixedly joining together two portions taken from commercially available circular-shaped gears or toothed sectors having the desired radius of curvature, it will be appreciated that one piece segmented gears can also be used in the practice of the invention. Such a one piece gear need merely have the dimensions and peripheral surface outline required. Importantly, however, the ends of the two gear segments provided on the one piece member need intersect, as earlier disclosed (FIG. 6), providing the pitch lines coincident with the axis of rotation of the cam rollers. Although the segmented gear used can be so provided, such are not likely to be readily available commercially and will need be created from scratch, resulting in considerably more cost.

As best shown in FIG. 4, it will be seen that a gear support member 49 is preferably provided for rotation on the spindle 36 and is disposed between the cam roller mount 48 and segmented gear 51. This gear support member 49 can take the same oval shape, as the segmented gear, if desired. Nevertheless, such a gear support member is not really critical to the practice of the invention. Being the same arcuate shape as the pitch line of the gear segments of the segmented gear 51 and of the same dimensions allows these curved peripheral surfaces defined by this member to ride on the horizontally disposed surface between next adjacent notches. Such a gear support member is desirable to keep the segmented gear 51 in optimum meshing engagement with rack 74. Where provided, the gear support member 49 will be provided at its opposed ends with arcuate-shaped cut-outs, as will be appreciated in FIG. 4, to allow for cam rollers 58, 60. These cut-outs should be of sufficient radius so as to cause no interference with the free rotation of the cam rollers. Neither should the ends of the curved surfaces of such a member extend too far as to interfere with the coupling and decoupling of a cam roller with a respective notch. Nevertheless, as will be appreciated a the gear support member 49 functions also as a spacer between the cam roller mount 48 and segmented gear 51. Thus, as disclosed more fully later on, this will better provide an assembly of members that can be connected together and function more like a unit.

The segmented cam gear 51, as is gear support member 49, and cam roller mount member 48, is provided with a centrally disposed opening denoted generally by reference numeral 37 whereby such members can be located on and detachably connected to spindle 36 for rotation as later more fully disclosed. Nevertheless, although these members can be connected/disconnected to spindle 36, as desired, it will be appreciated that, while connected to spindle 36, they are fixedly secured thereto, according to conventional technique, to provide positive rotation relative to the spindle and without any slippage. These members are located closely adjacent one another, as shown in the drawing (FIGS. 4, 6) and are connected together by conventional threaded members located in bores 77, 79 provided on diametrically opposite sides of the spindle (FIG. 6) in gear member 88, later more fully disclosed. As will be readily appreciated, bores are provided in each of the members of the assembly concentric to bores 77, 79 to accommodate the elongated threaded members. The threaded members (not shown) will extend through cam mount 48 terminating in threaded bores (not shown) provided in the step or shoulder 89 provided on spindle 36. Although two bores are shown in FIG. 6, this is not critical. There could be, for example, four bores, to accommodate four threaded members instead, if desired.

As will be readily appreciated by those skilled in the art, various known means and techniques can be used to sandwich these members together in an assembly, as shown in FIG. 4 of the drawings. The main consideration is that such members be oriented in the desired manner in the assembly, as will be better appreciated hereinafter, and that such orientation be maintained so long as a particular geometry of bottle 16 is being silk-screen printed.

The members in the cam means assembly, above-disclosed, need not all be connected together; however, this is most preferred, as such provides that the various members function as a unit; accordingly, these assembly members will be provided in proper registration with one another. Moreover, such an assembly offers somewhat greater ease in changeover in the printing of different size or shaped bottles or other objects. Nevertheless, if desired, each of the members in the assembly can stand alone on the spindle 36, i.e., not be connected together as a unit.

Mounted fixedly to spindle 36 for rotation and at a distance closer to its first end, as shown in FIG. 4, is an oval-shaped gear member or pinion gear 88 having a shape conforming to that of the surface outline of the bottle 16 to be printed, and having its pitch oval of the same dimensions. The gear member 88 meshes with a horizontally disposed elongated gear rack 90, fixedly connected to the bottom end of vertically disposed elongated member 91, the top end of which vertical member is connected to the screen support carriage 28. The rack 90 is mounted in lengthwise direction of the silk-screen printing apparatus 10 and is provided in perpendicular disposition to the spindle 36. Rack 90, as will be appreciated, conforms in shape to the path of reciprocation of the horizontally disposed silk-screen 92 in conventional silk-screen frame 94. The silk-screen 92 is planar in form and lies in a plane parallel to that of the top planar surface 66 of elongated member 68. Thus, the rack 90 is of rectilinear extent and of a predetermined length sufficient to accommodate the entire peripheral surface of the oval-shaped gear 88. The oval-shaped gear 88 is removably connected to the spindle 36 and is provided thereon in the same predetermined orientation as the chuck 42. The pitch radius of the gear member 88 should correspond to that of the radius of the curved surface to be printed so that the linear velocity of the curved surface being printed will be equal to the linear velocity of the screen. Driving connection is made between the oval shaped gear 88 and the rack 90 so that the screen is translated in synchronized manner with rotation of the article to be printed. Consequently, the linear velocity of the surface of the article 16 at its line of contact or tangential point with the screen is at all times equal to the linear velocity of the screen, and precise registration is maintained, regardless of the degree of variation of surface curvature of the article.

Located between the oval-shaped gear 88 and the segmented gear 51 is a gear support member 45. This member is of the same shape as oval-shaped gear 88 and has its arcuate-shaped pitch line coincident with the intermediate pitch line 89 of the teeth of gear 88 and rack 90. The arcuate-shaped peripheral surface of gear support member 45 in its rotation rides on the horizontally disposed planar surface 93 thereby maintaining the teeth of the gear 88 and rack 90 in the most optimum desired meshing engagement with one another.

Figure 8:
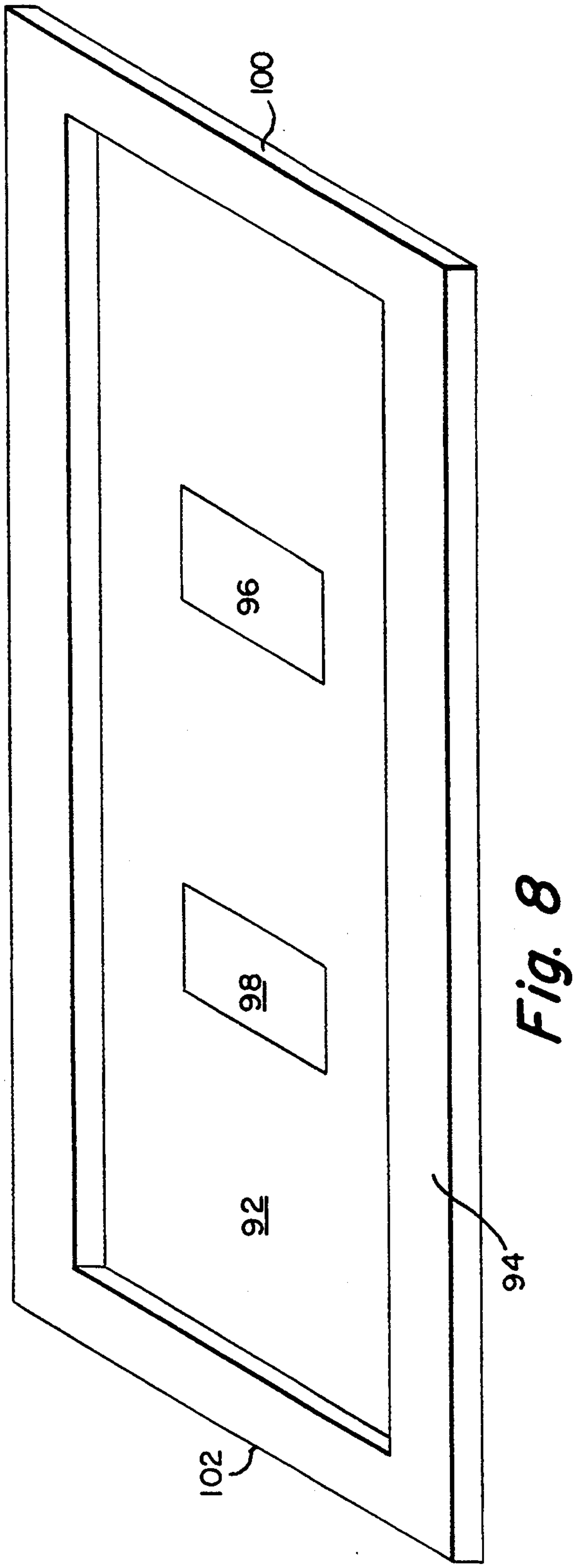
FIG. 8 is a perspective view showing a silk-screen according to the invention with multiple image patterns being provided thereon for use in apparatus of the invention.

The silk-screen 92 is provided in conventional fashion with two image patterns 96, 98, as shown more clearly in FIG. 8 of the drawing for the silk-screen printing of the two curved peripheral surfaces 12, 14, of the bottle 16 shown in FIG. 2. The images 96, 98 are located in predetermined spaced-apart locations extending from the downstream end 100 of the screen to the upstream end 102. The image pattern can be anything desired to be printed on the bottle, e.g., company name, logo, pictorial illustration, advertising copy, use instructions, etc. the same as now commonly printed on various plastic or glass bottles and other articles.

Figure 7:
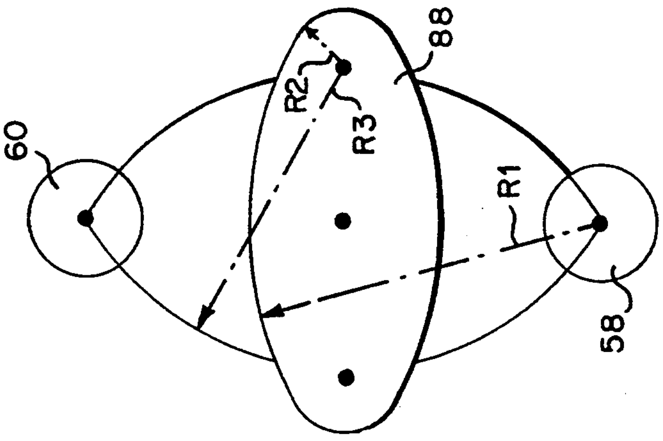
FIG. 7 is a diagrammatic view showing only the cam rollers, oval-shaped cam segmented gear and cam gear of the mechanism shown in FIG. 6 to show the relationship of the radii of the various assembled members.

The particular location of the image patterns 96, 98 on the screen 92 will be such as to have their mid-points equal to a distance that is one-half the distance of the peripherary of the bottle to be printed. This will depend to some extent upon, for example, the width of the bottle, the width of the image receiving surface, the width and location the image is to be printed on the bottle, and the length of the silk screen. Those in the silk-screen printing art will readily be able to determine the optimum locations for the image patterns to be provided on the silk-screen. Of critical importance, however, is the varying radius of curvature of the image receiving surface, the width, and the thickness of the oval-shaped bottle being printed. By thickness is intended, in the case of an oval-shaped bottle having two major peripheral surfaces of the same varying radius of curvature, as shown in FIG. 2, twice that distance from the exact center of the bottle to the point at the maximum radius of curvature. The width is twice that distance from the bottle's center to the centerpoint of the curved surface at the end of the oval. This radius of curvature, as earlier disclosed, determines also the length of the arc connecting the two cam rollers 58, 60; hence the length between next adjacent notches on elongated member 68. The length between next adjacent notches and next adjacent squeegees will, of course, be the same. Thus, where the radius of curvature of the circle described by the curved bottle surface to be printed is $R_1$, the radius of the minor curved surfaces or ends of the oval being $R_2$, the radius of the circle described by the centers of the cam rollers will be $R_3=R_1-R_2$, as shown in FIG. 7. As seen from FIG. 7, the "x" marks on oval-shaped gear 88, show the center of rotation of the gear, i.e., spindle 36, and centers of the ends, or minor curved surfaces, respectively. The determination of $R_3$ will, of course, determine not only the linear distance between next adjacent notches but also the linear distance that is determined by the arc or portion of circle connecting the centers of the cam rollers and the distance between the two squeegees, as earlier disclosed. The radius of curvature of an arcuate-shaped gear segment is, of course, also $R_3$. Nevertheless, it will be appreciated by those skilled in the art of silk-screen printing that allowance should be made not only for the length of the squeegee stroke, but also the fact that the distance the squeegee actually travels in a printing stroke should be somewhat greater. Thus, the squeegee stroke must need actually start and finish at some predetermined distance before the beginning of the image pattern and its end, i.e., a distance off the image pattern itself, to provide an image on the receiving surface of the bottle that is sharp.

As will be appreciated from what has been disclosed thus far, racks 74 and rack 90 lie in horizontal planes parallel to one another. Most importantly, however, these racks are provided at a fixed vertical distance from one another and remain so during the printing process. Thus, these racks are in a fixed relationship to the center of each oval-shaped curved panel radius, as that point of curvature moves during the print cycle.

Fixedly connected to the squeegee carriage 18 is a squeegee support member 104 comprising a cantilevered horizontally disposed bracket member 106 according to usual manner. The bracket member 106 supports squeegee holders 108, 110 of conventional construction each of which clamps a rubber squeegee in conventional manner for engagement with the top or upper surface of the silk-screen 92 in usual manner. The bottom or operating surface of the screen is rollingly engaged by the surface of the bottle 16 being provided with the image. The squeegee holders 108, 110 are located one behind the other, in lengthwise direction of the silk-screen printing apparatus. The squeegee holders 108, 110 are connected at their top ends to a yoke 112 of rectangular form for reciprocation vertically in a pair of conventional bearing housings 114, 116 for maintaining proper alignment of the squeegees according to usual techniques. The housings 114, 116 are supported in usual manner on the cantilevered bracket 106. The piston rod 118 of a double-acting pnuematic-motor 120 is secured to the yoke for reciprocation of the squeegee holders 108, 110 to provide the rubber squeegees held thereby to and from pressure engagement with the silk-screen top surface. Each of the squeegee holders is provided, with its own means for reciprocation vertically and for pressure contact with the silk-screen.

The squeegee support 104 being fixedly connected in cantilever fashion to squeegee carriage 18 results in the squeegee holders 108, 110 being translated in unison the same direction as the squeegee carriage, and for the same predetermined length or distance. This distance between next adjacent squeegees will, of course, be determined by the distance between the next adjacent notches 62, 64 provided in elongated member 68.

The translation of the squeegee carriage 18 is accomplished by means of drive means 122 comprising a slide member 124 mounted for reciprocation back and forth on two elongated, horizontally disposed rods 126, 128 (not shown). The ends of these rods are fixedly mounted in usual fashion in support members 26, 34. The slide member 124 is connected to squeegee carriage 18 by a connecting rod 130, the one end of which is detachably connected in conventional manner to a connecting ring 132 extending outwardly from and fixedly connected to the upstream end of the squeegee carriage 18 at its midpoint. The other end of the connecting rod 130 can be connected in similar manner, as shown in FIG. 1, to the top surface of slide member 124.

Translation of slide member 124 in back and forth manner on rods 126, 128 is caused by crank 134 rotatably mounted to the slide member. The drive shaft 136 is mounted at its top end to the crank arm at its center in usual fashion and at its bottom end to the apparatus main drive means (not shown).

The silk-screen printing apparatus or device 10 of the invention can be designed for use on automatic or semi-automatic printers. Nevertheless, it requires that the articles, e.g. plastic bottles, to be printed be loaded on and unloaded from the fixture bar 38 in orientation with the position or altitude of the bottle receiving base member or chuck 42. This member is identical in size and shape to the oval-shaped gear 88, this gear being oriented in like manner as the chuck 42 provided at the end of the spindle 36. The size and configuration of chuck 42 will depend upon the particular size and configuration of the oval-shaped bottle 16 to be printed. The orientation of the chuck 42 will, at the end of the print cycle, i.e., after having printed both sides of the oval-shaped bottle 16, be opposite to that at the beginning of the print cycle, as will be more readily appreciated hereafter, and by reference to FIG. 9.

In general, bottle 16 should be oriented at the beginning of the print cycle so that the plane dividing it in half lengthwise makes an angle of about 30–60 degrees to the horizontal, looking at FIG. 1 (the angle that gear 88 makes with the horizontal being the same). The particular angle or orientation required, however, will depend somewhat upon the shape and dimensions of the bottle being printed. The optimum angle of orientation of the bottle to be printed can readily be determined by those skilled in the silk-screen printing art.

If the silk-screen printing apparatus of the invention is to be used on automatic equipment, then any one of several bottle handling or transport systems can be used for conveying the bottles in the desired spaced-apart locations to the printing zone and thereafter to a curing station as is commonly done now. Those handling systems include, but are not limited to, walking beams, indexing conveyors, indexing tables, etc. One such a walking beam that will be found most advantageous in the practice of the invention is disclosed in U.S. Pat. No. 5,142,975 which issued on Sep. 1, 1992, entitled "Apparatus Suitable For The Rapid Silk-Screen Printing of Plastic Containers," to Autoroll Machine Corporation, the Assignee of the present invention. With such a silk-screen printing apparatus as disclosed herein, the bottle 16 to be printed is loaded and off-loaded at the same location of the silk-screen printing apparatus. Nevertheless, the bottle is presented to the chuck 42 at an angle of from about 30–60 degrees and when removed is oriented at an angle of from about 120–150 degrees to the horizontal, both curved surfaces having been printed and the bottle flipped over and rotated almost a full 360 degrees.

In operation, the squeegee drive 122 causes the squeegee carriage 18 to move to the right as indicated by the arrow in FIG. 1. This translation causes the elongated member 68 which is connected to the squeegee carriage to move to the right as well. Thus, the cam roller 58 at rest in the cam notch 62; as shown in FIG. 1, also moves to the right causing the spindle 36 to rotate in counterclockwise direction. At the same time, rotation of spindle 36 causes the oval-shaped gear 88 which is fixed to the spindle to be rotated, along with chuck 42. Thus, bottle 16 is simultaneously caused to rotate in counterclockwise manner, looking at FIG. 1 of the drawing. The silk-screen carriage 28 is caused to move in synchronism to the left, as indicated by the arrow in FIG. 1, due to the meshing of the oval gear 88 with the elongated rack 90. Thus, the gear 88 imparts a linear velocity to the screen which is equal to the surface velocity of the article to be printed.

Accordingly, the squeegee holder 108, moves downwardly in pressure engagement with the screen 92, the rubber squeegee moving over the first image pattern 96 provided in the silk-screen, at the same time causing the pool of ink (not shown), applied to the screen in conventional manner, to be pushed ahead and through the screen mesh or interstices forming the image to be printed on the curved receiving surface 12 of the bottle.

As the squeegee carriage 18 moves further to the right completing the initial stroke of the squeegee holder 108, the squeegee holder 108 moves vertically upwardly, as the cam roller 58 is caused to disengage from arcuate-shaped notch 62 and the arcuate-shaped gear segment 53 then engages the elongated rack 74. The squeegee carriage continues its movement to the right. The meshing of the teeth 57 of the arcuate-shaped gear segment with the teeth of rack 74 causes the oval-shaped bottle 16 to continue to rotate counterclockwise until the second cam roller 60 engages with cam notch 64 in the elongated member 68. At this time, and simultaneously with the upward movement of squeegee holder 108, the squeegee holder 110 has moved down in position to print the second image onto the other curved, peripheral surface 14 of the oval-shaped bottle, the bottle having been flipped over, turning on its axis of rotation 180 degrees. The squeegee carriage 18 continues its rightward movement causing the squeegee holder 110, the rubber squeegee held thereby being in pressure engagement with the screen, to pass over the image pattern 98 and causing the squeegee to force the pool of ink (not shown), applied to the screen in usual manner, through the screen onto the curved receiving surface 14, as such surface is rolled across the bottom of the screen 92.

It will be readily appreciated by reference to FIG. 9 hereinafter that, as the squeegee carriage 18 moves to the right during the printing stroke for the two images, the silk-screen carriage 28 moves to the left, in the opposite direction. After the squeegee holder 110 is passed over the image pattern 98, the full printing stroke is complete. The squeegee holder 110 is then caused to be raised vertically upwardly in usual manner, and the squeegee carriage and silk-screen carriage are each returned to their respective starting locations for the printing of the two surfaces of the next presented oval-shaped bottle 16.

The printing stroke above disclosed for an oval-shaped object such as bottle 16 will be more readily appreciated, it is believed, by reference to FIGS. *9a*, *9b*, *9c*, *9d* and *9e*. As shown therein, in FIG. *9a*, the printing stroke begins with the bottle 16 oriented at about 30–60 degrees (included angle) with respect to the horizontal as indicated. The cam roller 58 is located in the notch 62 with the squeegee holder 108 being located directly above the notch and the center of the cam roller. The center of the cam roller 58 lies in the same horizontal plane defined by the planar surface 66 of the elongated member 68 and at a distance vertically below the squeegee equal to that of the radius describing the curved peripheral surface 12 of the bottle 16.

In FIG. *9b*, it will be appreciated that the first image has been printed on the bottle, the bottle now having been flipped over so that it is oriented in the opposite direction to that shown in FIG. *9a* at an included angle of about 30–60 degrees. The squeegee holder 108 has moved to the right, causing the elongated member 68 to do likewise, and the rubber squeegee is still positioned directly above the center of the cam roller 58. The position of the squeegee holder 108 during that part of the print stroke for the printing of the image 96, as is critically necessary, remains over the center of the segment of the circle described by the oval surface of the bottle, as the bottle is rotated and simultaneously rotated on its own axis.

FIG. *9c* shows the squeegee carriage 18 having traveled further to the right, the cam roller 58 having disengaged from the notch 62. The cam gear segment 57 is now engaged with the elongated rack 74 (not shown in FIG. 9). Thus, as shown in this figure of the drawing, the bottle 16 is being flipped or turned over to present the curved peripheral surface 14 to the silk-screen for printing of the image 98.

In FIG. *9d* the bottle 16 has been flipped over allowing the cam roller 60 to now be engaged with notch 64. The further movement to the right of the squeegee carriage 18 (elongated member 68) causes the spindle 36 to continue its counterclockwise rotation and the second surface 14 of the oval-shaped bottle to be printed.

Figure 9A:
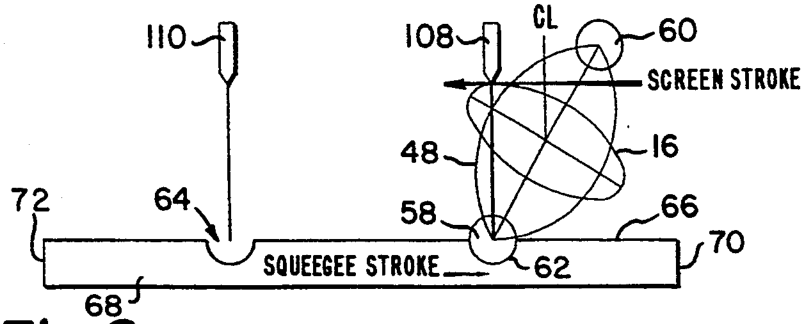
FIGS. 9*a*, 9*b*, 9*c*, 9*d* and 9*e* are diagrammatic views showing one pass printing of an oval-shaped article according to the invention, and the operation of the cam means or gear train in causing the bottle being printed to be rotated about its center and flipped over from one major curved surface to the other in presenting each of the curved surfaces for silk-screen printing.
Figure 9B:
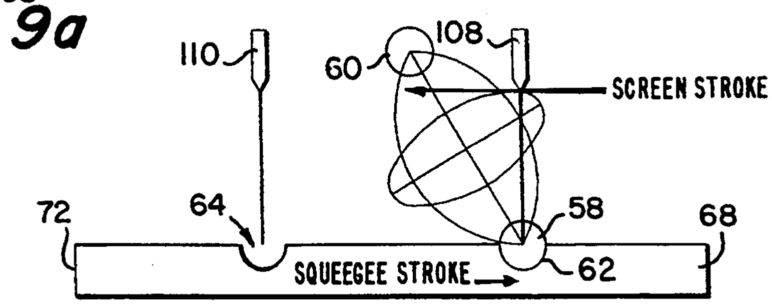
Figure 9C:
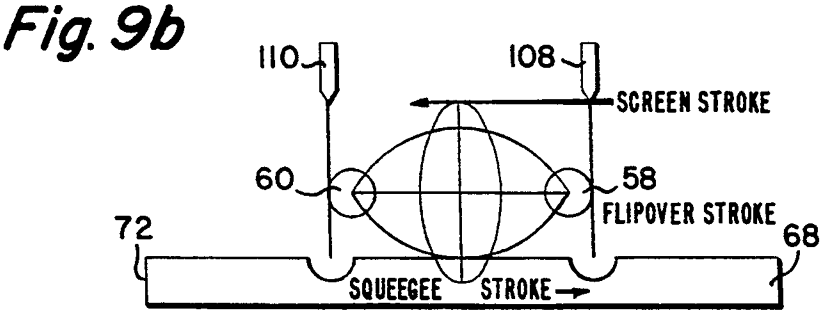
Figure 9D:
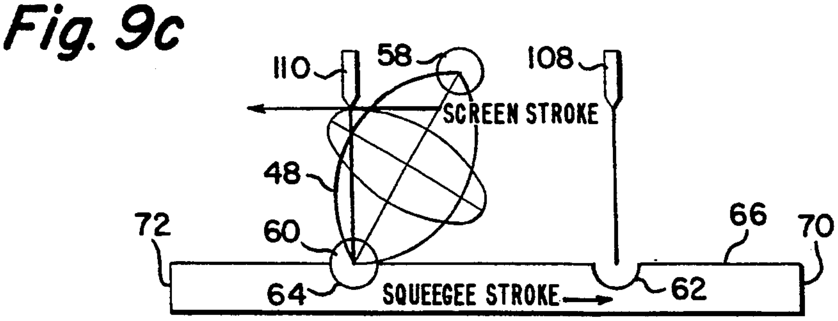
Figure 9E:
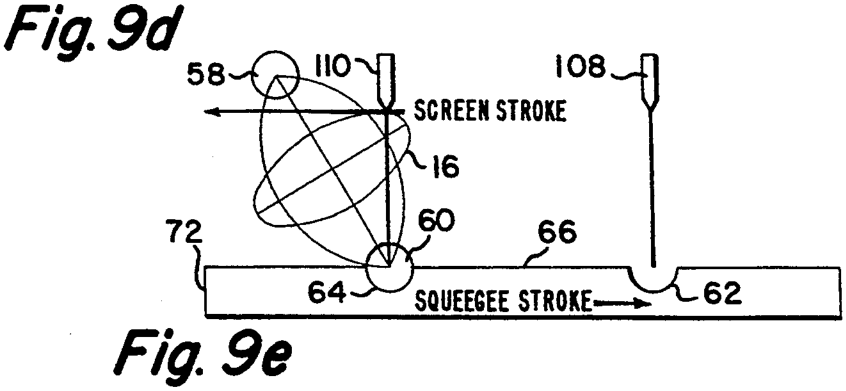

As shown by FIG. 9*e* the squeegee carriage 18 has completed its movement to the right, i.e., the print stroke for the two images has been completed. The bottle 16 now oriented in this off-loading position is ready for off-loading, with the squeegee carriage and silk-screen carriage being returned at the same time to their respective starting positions for the loading and printing of the next bottle. This is accomplished by the squeegee carriage moving the opposite direction, resulting in the elongated member being moved to the left in FIG. 9*e* and clockwise rotation of spindle 36.

The translation of the squeegee carriage (hence squeegees) produces synchronized rotation of the article to be printed with translation of the screen in the direction opposite to that of the squeegee. The angular velocity of the article is varied inversely in proportion to the local radius (tangent point of screen with curved surface) of curvature of its surface. Consequently, the linear velocity of the surface of the article at its line of contact with the screen is at all times equal to the linear velocity of the screen, resulting in the curved surface of the article to be rolled on the screen.

It will be appreciated that as the oval-shaped bottle 16 rotates in counterclockwise manner during the printing cycle, this action causes the pivotal fixture bar 38 to oscillate vertically upwardly and then downwardly to its original horizontally disposed plane. This arcuate oscillation is assisted by the counter-balancing fixture bar cylinder 138 according to usual manner and the controlling force of the cam oval-shaped gear 88 riding on the restraining surface of the elongated rack 92. Thus, the curved surfaces of the oval-shaped bottle to be printed are kept in the proper registration with the silk-screen mounted on screen carriage 28 and the image patterns provided therein. The apparatus of the invention provides precise registration of the image pattern provided in the silk-screen and the curved surface of the article to be printed, and is capable of accurate and precise silk-screen printing on both peripheral surfaces no matter how great the variation in radius of curvature may be.

One will readily appreciate from FIG. 5 that the opposed elongated racks 74, 90 sandwich and restrain the oval-shaped gear 88 and an arcuate-shaped cam segmented gear 51 as the two racks travel in opposite directions. At the same time, the oval-shaped bottle 16 rotates on spindle 36 while the fixture bar oscillates vertically up and down in such a manner as to permit the oval-shaped bottle to move beneath and in pressure contact with the working surface of the screen 92 in perfect synchronism and position for acceptance of the printed image. The two racks 74, 90, as will be appreciated, are fixed vertically and can move only in a horizontally disposed plane defined by each rack. The cam gear 88, as will be appreciated, has a dual function. It functions as a gear in the translation of the rack 90; however, it also acts like a cam in causing the fixture bar 38 to be raised and lowered as the bottle 16 is rotated about its axis. It will also be appreciated that, because the elongated member 68 and the elongated rack 90 are in fixed horizontal relationship to one another that the spindle 36 will need move vertically up and down and cannot move horizontally. Thus, the spindle 36 is not only constrained horizontally but it is also constrained vertically. Thus, the bottle 16 can be rotated or flipped over about its own axis for the printing of each of the curved surfaces 12, 14.

Quite advantageously, the invention as above-disclosed causes an oval-shaped article to be moved or rotated as though it were a simple round cylinder, rotating on a stationary spindle beneath a screen as the screen travels over its circumference. In this case, the curved surface being printed is rotated about the axis of the bottle, rather than the axis of the circle described by the curved surface. Therefore, the two image patterns 96, 98 can be located somewhat closer together than if the spindle 36 was not so constrained. Thus, a shorter print stroke is necessitated. Furthermore, and this is most advantageous, nearly every oval-shaped article, e.g. bottles, can be silk-screen printed with apparatus according to this invention, taking into account the retooling and machine set up adjustments necessitated by bottles having different surface curvature or being of a different size. As will be appreciated, the changeover to print an oval-shaped bottle of a different size or radius of curvature requires primarily the removal of the cam means 46 including the oval-shaped gear 88 and chuck 42, and substitution of like components of the appropriate size. Thus, removal of a spindle 36 with the cam means 46 located at one end and chuck 42 at the other, and replacement with another such assembly as required by the geometry of the new bottle to be printed, is relatively easy to do, making change-over efficient and relatively easy to accomplish. The slide member 80 will, of course, need be adjusted accordingly to accommodate the changed cam means or gear train, etc. The squeegee holders can be supported in such fashion that the distance between them can be readily adjusted, according to conventional engineering practices. Moreover, because the silk-screen printing apparatus of the invention uses very few change parts, conversion for the printing of bottles which do not have two oval-shaped surfaces of the same varying radius of curvature is relatively rapid and simple.

Although in the more preferred and specific embodiment of the invention disclosed heretofore, two squeegee holders are required to be positioned and their movement synchronized in combination with a single silk-screen in such a manner as to force ink through the screen as each of two image patterns on the screen moves over the two curved, peripheral surfaces to be printed, it is not so limited. It is also within the invention to use a single squeegee and silk-screen having multiple image patterns provided therein, in combination. In such a silk-screen printing apparatus, the single squeegee will need be properly repositioned after the first surface on the oval-shaped article is printed with the first image pattern. Thus, the repositioning of the single squeegee must be synchronized with the second image to be printed as the screen moves over the second surface of the oval-shaped article to be printed. In either case, however, i.e., whether two squeegees, or a single squeegee, are used in a silk-screen printing apparatus according to the invention, it will be appreciated that the position of the squeegee during the print cycle must remain over the center of that segment of the circle described by the localized point of the curved surface being printed as the oval-shaped article is being rotated on its axis. In other words, a squeegee, whether one is reciprocated or two are moved in unison, must move in a fixed relationship with the center of each surface of curvature radius as that point moves during the print cycle. See for example, FIG. 9.

It is believed that those skilled in the art will be readily able to provide the necessary geometry of the various tooling gears and other members used in any apparatus of the invention to keep a squeegee in proper position and synchronization with the center of the segment of the circle described by the first oval surface to be printed as it rotates beneath the screen, that center being identical to the position of the lower one of the two cam rollers on the elongated cam member, e.g., as shown by FIGS. 9(*a*), (*b*). There are, of course, two centers of concern represented by the two cam rollers 58, 60 when the oval-shaped articles are silk-screen printed on two opposed surfaces, as disclosed hereinabove.

If one squeegee is used to print an oval-shaped article, as earlier disclosed, the geometry of the various tooling gears will need keep it in proper position and synchronization with the center of the segment of the circle described by the first oval surface to be printed as it rotates beneath the screen. That center is, as earlier stated, identical to the position of the lower of the two cam rollers on the cam mount. There are two centers represented by two cam rollers when oval-shaped articles are printed on two sides. Thus, both need be considered in the geometry of the tooling fixtures provided.

The vertical squeegee and flood bar motion along with the repositioning of the squeegee for second side printing, where only a single squeegee is provided, can readily be accomplished with the use of timing circuits and air cylinders, stepping motors or cams, according to techniques and practices well known to those skilled in the design of silk-screen printing apparatus. If two squeegees are provided as earlier disclosed, the two squeegees are simply positioned relative to one another and the bottle to be printed so as to remain over the two oval-shaped article's radius centers, i.e., cam roller center as located in its notch, as each rotates beneath the surface to be printed. In this case, only the squeegee and flood bar vertical motion need be timed. Nevertheless, the synchronization of the squeegees with the silk-screen and article to be printed will need be considered at the end of the printing stroke and the return of the carriages to their initial positions for the printing of another article.

Quite advantageously, it is possible to print only one side or surface of an oval-shaped article, even though the silk-screen printing apparatus to be used is provided with two squeegees. In this case, the second squeegee need be merely removed from the apparatus or mounted so that it can be positioned so as to be inactive. The stroke set on the squeegee drive, in such a case, will need be shortened somewhat and adjustments made to the positioning of the squeegee carriage, oval gear and the elongated notched member so that only one cam roller is engaged during the print cycle.

Figure 10:
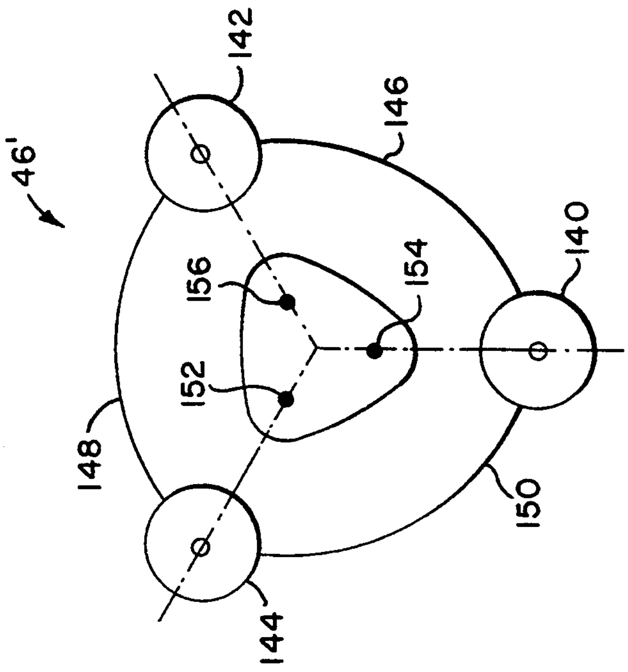
FIG. 10 is an end view showing a cam roller mounting member with cam rollers mounted thereto according to the invention for use in the printing of the three curved surfaces in one pass of an article having three curved, peripheral surfaces.

Although the apparatus of the invention and manner of silk-screen printing disclosed earlier has been directed to the printing of oval-shaped articles, i.e. articles having two peripheral surfaces to be printed, each of a varying radius of curvature, it will be appreciated that such is not so limited. The apparatus disclosed herein readily lends itself to the printing of articles having more than two curved surfaces. For example, in FIG. 10, a cam roller mount 46' is shown for the silk-screen printing of an article, e.g. a plastic bottle, provided with three curved surfaces. Cam roller mount 46' is provided with three cam rollers 140, 142, and 144. The location of the centers of each of these cam rollers is of critical concern, as earlier disclosed. Each gear segment 146, 148, 150, as shown in the drawing, is of the same respective varying radius of curvature. The centers of the circles described by the gear segments are shown in FIG. 10, and referred to by reference numerals 152, 154, 156, respectively. The centers of each of the next adjacent cam rollers is located at the intersections of the ends of two next adjacent gear segments, as will be appreciated from FIG. 10. The lines connecting these two centers, i.e., that of a cam roller, and a gear segment, when extended, intersect at the center point that determines the center line or axis of the elongated cam roller or member. Thus, the notches to be provided on the elongated member 68 will be spaced apart a distance such that the center lines of two adjacent notches is equal in length to that length of arc connecting the centers of two next adjacent cam rollers, as measured along the pitch line of the gear segment between the two cam rollers. As will be appreciated, the gear member such as that referred to earlier by reference numeral 88 will have the same peripheral shape as that of the article to be printed, and be of the same dimension.

The squeegee carriage 18, as will be readily appreciated, need not necessarily be driven by a drive means such as shown in FIG. 1 and identified, in general, by reference numeral 122. Other drive means also will be found quite satisfactory in the practice of the invention.

The unique features of the oval-shaped article positioning and printing apparatus disclosed herein make it possible with certain modifications, as believed will be appreciated by those skilled in the art, to print the complete surface of an oval-shaped article, if desired, or to print two opposed surfaces with two different colors. Furthermore, the apparatus mechanism or cam means of the invention constituting the fixed elongated racks, spindle, and cam assembly can be readily adaptable for applying thermal transfer labels, pressure-sensitive adhesive labels, offset printing, roll pad printing, as well as other means of direct and indirect labeling and printing.

This apparatus of the invention can be used also to convert presently existing oval printing machines wherein a single oval surface is printed to one capable of printing both of the curved peripheral surfaces of the oval-shaped bottle with relatively little tooling. Thus, any presently existing machines for printing ovals in the three ways earlier disclosed, in reference to the prior art, can be adapted to apparatus for the printing of both sides of an oval-shaped bottle, as disclosed herein. This will include providing the silk screen printing machine with a fixture bar as disclosed herein, if the silk-screen printing machine is not now provided with such a member. Such a conversion will, most importantly, include the use of a cam means or gear train as disclosed herein. And, in some cases provision will need be made for movement vertically up and down of the elongated member 68 to accommodate bottles of various geometry. Where the existing apparatus for silk-screen printing ovals involves means for translating the screen rather than the ink-knife carriage, the cam means 46 of this invention can be adapted. These conversions, and the tooling needed for accomplishing the same, can be readily accomplished, it is believed, by those skilled in the design of silk-screen printing machines, from the disclosure herein, in particular with the respect to the cam means for printing multiple curved surfaces.

Although in the most preferred embodiment of this invention, in the printing of oval-shaped bottles, the spindle is constrained horizontally and can only move vertically, the cam means or gear train means of this invention can be adapted for use in silk-screen printing machines wherein the rotatable spindle is maintained stationary vertically, as well. In such a case, the squeegee carriage and screen carriage can be made to move vertically upwardly and downwardly applying known techniques, in combination with cam or gear train means such as disclosed herein for presenting the curved surface to the screen and flipping the bottle over for printing both of the curved surfaces.

Figure 11:
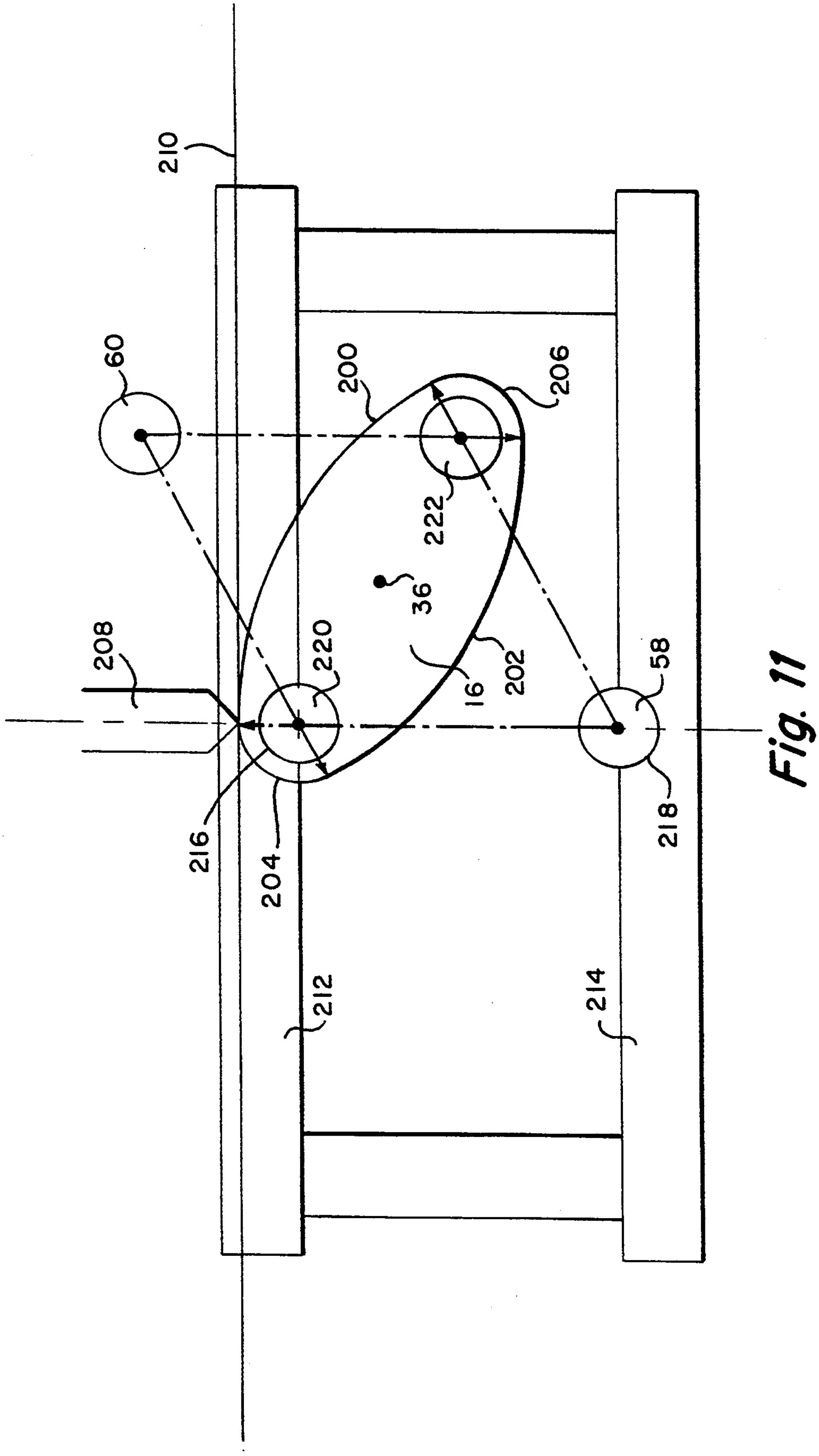
FIG. 11 is a schematic representation showing the use of two elongated members, each being provided with a single notch in the printing of the entire peripheral surface of an oval-shaped object such as a plastic bottle.

Apparatus according to the invention, with appropriate modifications, can be used to print the entire peripheral surface of an oval-shaped bottle, i.e., the two major curved surfaces 200, 202 and the two ends or minor curved surfaces 204, 206. One way to do this, using a single squeegee 208, is shown in FIG. 11. Thus, the screen carriage 210 is driven. The cam means for rotating the bottle will be modified to have fixedly mounted upper and lower, horizontally disposed, elongated members 212, 214 such as elongated members 68, each being provided, however with only a single notch, one directly above the other, these being referred to by reference numerals 216, 218. Such members will be provided without rack components, i.e., gear teeth, as the modified cam means in this case will not include a segmented gear. Cam rollers 220, 222 will be located at the centers of the circles described by the radii of the two minor curved surfaces. Such rollers will engage the notch in the upper elongated member. Rollers such as noted earlier by reference numerals 58, 60 will engage the notch 218 in the lower elongated member as disclosed earlier. Oval gear 88 and rack 90 will be the same. Thus, in such a silk-screen printing apparatus, a major curved surface will be silk-screen printed as disclosed herein with translation of the lower elongated, notched member. At the end of that printing stroke, the roller disengages from the bottom notch and the top roller engages the notch in the upper notched member. The top roller is located at the center of curvature of the end or minor curved surface. Thus, the squeegee is driven so that it then translates in the opposite direction, i.e., it will be moving in the same direction as the screen carriage, not opposite thereto, as in the printing of the major curved surface. The squeegee will, of course, be kept in its travel over the center of curvature of the curved end peripheral surface. On completion of that printing stroke the squeegee has returned to its starting point. At this time the upper cam roller disengages from its notch, at the same time the bottom cam roller engaging with the bottom notched member. The squeegee is relocated to the center of rotation of the second major curved surface, and the squeegee and screen carriages are moved in opposite directions while the major curved surface is rolled on the screen surface. The squeegee is positioned as before in the printing of the second end curved surface.

It will be appreciated that the distance of squeegee travel for printing the first major curved surface and the distance the squeegee travels back in the opposite direction to print the first minor curved surface is the same. This positions the squeegee at the proper location to print the second major curved surface. Thus, the first minor curved surface and the second major curved surface are tangent at this time.

Although earlier reference was made to a spindle 36 as if constituting a single elongated member, such term includes such a spindle, as well as one provided in two lengths. For example, the elongated rotatable member or spindle 36 shown in FIG. 4 can be connected to an existing spindle or a shorter one as needed, to provide a spindle for the rotation of the article to be printed, etc. This coupling can be accomplished by various well-known techniques. Thus, changeover for the printing of bottles of different geometry can be, perhaps, facilitated by leaving an existing spindle in place mounted to the pivotal fixture bar. The cam means or gear train can be removed from the end of the spindle and replaced with such an assembly suitable for printing the bottle of different geometry. The existing chuck will be removed from the other end of the spindle and replaced with one having the appropriate geometry.

As understood by those skilled in the art, various modifications and changes can be made in the invention and its form and construction without departing from the spirit and scope thereof. The embodiments of the invention disclosed herein are merely exemplary of the various modifications that the invention can take and the preferred practice thereof. It is not, however, desired to confine the invention to the exact construction and features shown and described herein, but it is desired to include all such as properly come within the spirit and scope of the invention disclosed and claimed.

What is claimed is:

1. Apparatus means for use in presenting each of a multiple number of curved peripheral surfaces of an article having a multiple number of curved peripheral surfaces, in turn, at a single station for application of a predetermined desired material to each of the curved surfaces comprising, in combination:

(a). an elongated rotatable member mounted in horizontal disposition for rotation about its own axis and defined by first and second ends;

(b). means provided at the first end of the elongated rotatable member for fixedly mounting the multiple curved surface article;

(c). an elongated member located below the rotatable elongated member being disposed in a horizontal fixed plane and being mounted for translation back and forth in that plane, said elongated member being defined by a top planar surface, a plurality of elongated arcuate-shaped spaced-apart notches being provided in said top surface along the length thereof, an elongated first rack of a predetermined length being provided in said top surface of the elongated member, said notches each being disposed in a direction transverse to the elongated first rack;

(d). a cam roller mounting member defined by at least one planar surface, a plurality of elongated, circular-shaped cam rollers each being spaced-apart from one another a predetermined length mounted to the cam roller mounting member and extending perpendicularly outwardly from said planar surface, said cam roller mounting member being fixedly mounted to said elongated rotatable member for rotation therewith, the elongated cam rollers being capable of being coupled with and decoupled from respective of said notches in the elongated member, as desired:

(e). a segmented gear member mounted for rotation on the elongated rotatable member comprising a multiple number of gear segments each being of arcuate shape and provided on its periphery with a plurality of teeth intermeshable with the teeth on the first rack and being defined by first and second ends, the first end of one gear segment being joined to the first end of a next adjacent gear segment, an arcuate-shaped intermediate pitch line being defined by the plurality of teeth on each said gear segment, the ends of the pitch line of one gear segment when extended intersecting with the ends of the pitch line of the other gear segment connected thereto and defining a line in a direction transverse to the segmented gear member parallel to the axis of the elongated rotatable member and coincident to the axis of the elongated rotatable cam rollers, the arcuate-shaped gear segments each defining an arcuate-shaped surface between the first and second ends having the same radius of equal length;

(f). a gear support member being located between said cam roller mounting member and said segmented gear member having the shape and surface outline of said segmented gear member, said outline being defined by the arcuate-shaped pitch line of the segmented gear member, said top surface of the elongated notched member being in the same plane defined by the axis of rotation of a cam roller when such a roller is engaged in a notch of the elongated notched member whereby the peripheral surface of the gear support member on being rotated by the spindle will ride on the top planar surface of the elongated member;

(g). a gear member of predetermined dimension and peripheral surface outline mounted to the rotatable elongated member for rotation therewith, said gear member conforming to the surface outline of the article to which material is being applied; and (h). a horizontally disposed second rack capable of translation in a linear direction being operatively engaged with the gear member.

2. Apparatus means suitable for rotating an elongated spindle about its axis defined by a first end and a second end, an article defined by at least one curved surface being located at and supported for rotation about its axis by the spindle at the first end of the spindle, said apparatus means comprising in combination:

(a). an elongated horizontally disposed member defined by a top planar surface, a first horizontally disposed elongated rack being provided in said top planar surface and a plurality of notches provided in the top planar surface in predetermined spaced-apart locations directly adjacent to the rack and along its length;

(b). means for holding the elongated member and supporting it in a fixed horizontal plane for movement in that plane;

(c). elongated means rotatable about its axis disposed in a horizontal plane and being laterally disposed to the horizontally disposed elongated member, means fixedly connected to the rotatable elongated member at one end for connection to the second end of the spindle whereby said elongated means can provide rotation of said spindle and article;

(d). cam roller mount operatively connected to the rotatable elongated means for rotation therewith, and a plurality of cam rollers each mounted to the cam roller mount for rotation about an axis perpendicular to the cam roller mount;

(e). a segmented gear member being fixedly connected to said cam roller mount for rotation with said rotatable elongated member comprising two segmented gears each having the same radius of curvature;

(f). a gear support member defined by a peripheral outline like that of the segmented gear member being located between the cam roller mount and the segmented gear member whereby on rotation of the spindle the peripheral surface of the gear support member can ride on the top surface of the elongated member and define the pitch line for the teeth of the rack and segmented gear member;

(g). a gear member of predetermined dimensions and surface outline comparable to the article being rotated by said spindle;

(h). a second gear support member being located between said gear member and said arcuate-shaped gear member being defined by a peripheral outline defining the intermediate pitch line of the teeth of said gear member;

(i). a second elongated rack located in a horizontal plane vertically above the first rack a predetermined vertical distance, said first and second racks being in fixed vertical relationship to one another, said second rack being capable of being moved back and forth in the horizontal plane; and (j). means connected to said second rack for supporting it in the horizontal plane whereby on movement of the means holding the said elongated member, the elongated member will be caused to translate in linear direction, the spindle will be rotated, and the means connected to the second rack will be caused to translate in a direction opposite to that of the means holding the elongated member, said means being defined by a horizontally disposed surface defining the intermediate pitch line of the teeth provided on the gear member and whereby the peripheral surface of the second gear support member will ride on said top planar horizontally disposed surface.

3. Apparatus means for presenting at least one curved peripheral surface of an article defined by a multiple number of curved peripheral surfaces to means for application of a suitable material to said at least one curved peripheral surface comprising, in combination:

(a). first and second elongated rack members being mounted in horizontal planes whereby said first rack member is located vertically a fixed distance above the second elongated member, the first and second elongated rack members being so mounted that the first elongated rack member is capable of being reciprocated back and forth in a first linear direction in the horizontal plane defined by it and the second elongated rack member being capable of being reciprocated back and forth in the horizontal plane defined by it but in a second direction opposite to the first direction of the first said rack member;

(b). means for causing the first rack member to be translated in a first direction;

(c). an elongated rotatable member being mounted for rotation about its axis and being located transversely to the elongated rack members and lying in a horizontal plane between said two rack members, (d). a segmented gear member being located on the rotatable member for rotation therewith and being capable of being intermeshed with the first rack member whereby on translation of said first rack member the segmented gear member will cause rotation of the rotatable member; and (e). a gear member being located on the rotatable elongated member for rotation with said member and being intermeshed with the second rack member whereby on rotation of the rotatable member that rotation will cause translation of the second rack member, causing each of the curved surfaces to be presented for application of said material.

4. Cam and gear train means for providing simultaneous rotation of a spindle about its axis and translation of two horizontally disposed members in opposite directions comprising, in combination:

(a). an elongated horizontally disposed member defined by a top surface, a plurality of elongated notches being provided in the top surface, each being of an arcuate shape and defining an arc of 180 degrees and being spaced apart from one another a predetermined distance, said first member being capable of being translated in a horizontally disposed plane;

(b). a first elongated rack being provided in the top surface of the elongated member defined by inner and outer parallel edges, said elongated notches being disposed perpendicularly to said inner and outer edges;

(c). an elongated member having first and second ends and a means provided on said first end for connection to the said spindle for rotation thereof;

(d). a cam roller mount mounted to said elongated member at said second end for rotation therewith, a plurality of circular-shaped elongated cam rollers each being rotatably mounted on the cam roller mount about its axis;

(e). a segmented gear member mounted to the elongated member and in intermeshing engagement with the first rack comprising two segmented gears each of the same radius of curvature and being defined by a plurality of teeth defined by an intermediate arcuate-shaped pitch line, the ends of the pitch lines of the gear segments intersecting with one another and being coincident with the axis of rotation with respective cam rollers;

(f). a gear member being provided on said elongated rotatable member and located inwardly from its second end and said segmented gear member; and (g). a second elongated rack located in fixed parallel disposition to the first rack and a predetermined distance vertically above said second rack being translated in a horizontally disposed plane and said gear member intermeshing with the second rack, whereby on translation of the elongated horizontally disposed member in a first direction the first rack will cause rotation of the elongated member to which the spindle is connected to its first end, and rotation of the gear member will cause translation of the second elongated rack in a second direction opposite to that of the first direction the elongated member is being translated.

* * * * *